(12) United States Patent
Manabe

(10) Patent No.: US 10,532,500 B2
(45) Date of Patent: Jan. 14, 2020

(54) HOLLOW PRODUCT AND METHOD OF MAKING THE PRODUCT

(71) Applicant: MANABE INDUSTRY CO., LTD., Hiroshima (JP)

(72) Inventor: Takamasa Manabe, Hiroshima (JP)

(73) Assignee: MANABE INDUSTRY CO., LTD., Hiroshima (JP)

(*) Notice: Subject to any disclaimer, the term of this patent is extended or adjusted under 35 U.S.C. 154(b) by 0 days.

(21) Appl. No.: 15/843,301

(22) Filed: Dec. 15, 2017

(65) Prior Publication Data

US 2019/0061213 A1    Feb. 28, 2019

Related U.S. Application Data

(63) Continuation of application No. PCT/JP2017/030399, filed on Aug. 24, 2017.

(30) Foreign Application Priority Data

Aug. 22, 2017   (JP) .................. 2017-159093

(51) Int. Cl.
| | |
|---|---|
| *B29C 45/14* | (2006.01) |
| *B29C 45/17* | (2006.01) |
| *F04D 29/42* | (2006.01) |
| *F01D 9/02* | (2006.01) |
| *B22D 19/04* | (2006.01) |
| *F04D 29/02* | (2006.01) |
| *B29L 23/00* | (2006.01) |

(52) U.S. Cl.
CPC ........ *B29C 45/14008* (2013.01); *B22D 19/04* (2013.01); *B29C 45/1418* (2013.01); *B29C 45/17* (2013.01); *F01D 9/026* (2013.01); *F04D 29/023* (2013.01); *F04D 29/4206* (2013.01); *B29L 2023/00* (2013.01); *F05D 2220/40* (2013.01); *F05D 2230/20* (2013.01); *F05D 2300/121* (2013.01)

(58) Field of Classification Search
CPC .......... B29C 45/14008; B29C 45/1418; B29C 45/17; B29L 2023/00; F04D 29/4206; F04D 29/023; F01D 9/026; F05D 2230/20; F05D 2220/40; F05D 2300/121; B22D 19/04

See application file for complete search history.

(56) References Cited

U.S. PATENT DOCUMENTS

| | | | |
|---|---|---|---|
| 3,877,126 A | 4/1975 | Deutschmann et al. | |
| 6,024,730 A * | 2/2000 | Pagan ............... | A61M 25/0054 604/264 |
| 2016/0238013 A1 | 8/2016 | Weigl et al. | |

FOREIGN PATENT DOCUMENTS

| | | |
|---|---|---|
| EP | 3064721 A1 | 9/2016 |
| JP | 2012-57592 A | 6/2012 |
| JP | 62-21454 A | 2/2015 |
| JP | 2016-084710 A | 5/2016 |

(Continued)

OTHER PUBLICATIONS

International Search Report of PCT/JP2017/030399 dated Sep. 13, 2017.

*Primary Examiner* — James C Yager
(74) *Attorney, Agent, or Firm* — Maschoff Brennan

(57) ABSTRACT

Disclosed herein is a technique for insert-molding a tubular member to define a hollow portion. A circumferential portion of a circumferential wall of the tubular member is removed to expose the hollow portion to outside.

3 Claims, 7 Drawing Sheets

(56) References Cited

FOREIGN PATENT DOCUMENTS

| JP | 2016-160941 A | 9/2016 |
| JP | 2016-536501 A | 11/2016 |

\* cited by examiner

HOLLOW PRODUCT AND METHOD OF MAKING THE PRODUCT

CROSS-REFERENCE TO RELATED APPLICATION

This is a continuation of International Application No. PCT/JP2017/30399 filed on Aug. 24, 2017, which claims priority to Japanese Patent Application No. 2017-159093 filed on Aug. 22, 2017. The entire disclosures of these applications are hereby incorporated by reference.

BACKGROUND

The present disclosure relates to a hollow product configured as an insert-molded product, including an insert-molded tubular member, and a method of making the hollow product. More particularly, the present disclosure relates to a hollow product in which the tubular member and a material surrounding the tubular member have been partially removed, and a method of making such a product.

Recently, to achieve a low fuel cost, a downsized turbocharger is more and more often built in automobile engines. A turbocharger attached to an engine of this type includes an impeller and a compressor housing to house the impeller. The compressor housing generally has a scroll shape with an undercut portion (see, for example, Japanese Unexamined Patent Publications No. 2016-160941, No. 2016-84710, and No. 2012-57592, and Japanese Translation of PCT International Application Publication No. 2016-536501).

In the turbochargers disclosed in Japanese Unexamined Patent Publications No. 2016-160941, No. 2016-84710, and No. 2012-57592, and Japanese Translation of PCT International Application Publication No. 2016-536501, their compressor housing has, at its central portion, an impeller housing portion to house the impeller. On the outer periphery of the compressor housing, an air passage is provided to extend around the impeller housing portion. A circumferential portion of a circumferential wall that defines the air passage is locally opened to make the air passage communicate with the impeller housing portion. The air, flowing out of the impeller housing portion, flows into the air passage through the opened portion of the air passage, and then flows out of the air passage through a downstream end thereof to be fed to the engine.

In general, the air passage of the compressor housing has a nearly circular or elliptical cross section and usually has a so-called "undercut shape" which prevents a die from passing through it. The compressor housing is just an example of various hollow products with such an undercut shape. There are many other products of that type.

If a hollow product with such an undercut shape is made of an aluminum alloy, for example, the hollow product may be formed by a sand mold casting process which uses a core that is removable by a process step after the casting process. Alternatively, when the hollow product is formed by die-casting, a plurality of parts may be once produced separately and then assembled together.

The sand mold casting process using a core results in poor productivity because the process takes a cycle time of as long as about five minutes. Meanwhile, according to the die-casting process, the respective parts need to be formed separately and then assembled together, thus raising the manufacturing cost, which is not beneficial.

In view of the foregoing background, it is therefore an object of the present disclosure to cut down the cost of making a hollow product by allowing the product to be molded integrally in a shorter cycle time.

SUMMARY

To achieve this object, the present disclosure exposes a circumferential portion of an insert-molded tubular member to outside by partially removing the tubular member.

A first aspect of the present disclosure is directed to a hollow product having a hollow portion, in which a tubular member to define the hollow portion has been insert-molded and in which a circumferential portion of a circumferential wall of the tubular member has been removed, thus exposing the hollow portion to outside.

According to this configuration, insert-molding the tubular member in advance allows a hollow portion to be defined inside the tubular member with no sand mold casting process performed with a core. In addition, removing a circumferential portion of a circumferential wall of the tubular member allows the hollow portion to be exposed to outside. Thus, the hollow portion can be obtained as an integrally molded product, which is not comprised of a plurality of parts assembled together. Consequently, this allows the hollow product to be integrally molded in a shorter cycle time at a reduced cost.

A second aspect of the present disclosure is an embodiment of the first aspect of the present disclosure. In the second aspect, the hollow portion has been formed in an undercut shape.

A third aspect of the present disclosure is an embodiment of the first aspect of the present disclosure. In the third aspect, the circumferential portion of the circumferential wall of the tubular member has been removed along with a material surrounding the tubular member, thus exposing the hollow portion to the outside.

According to this configuration, when the tubular member is partially embedded by insert molding, the embedded portion of the tubular member can be exposed to the outside.

A fourth aspect of the present disclosure is an embodiment of the first aspect of the present disclosure. In the fourth aspect, the hollow portion is a passage through which a fluid is allowed to flow.

This configuration allows a hollow product having a passage with an undercut cross section to be obtained at a reduced cost. In addition, this configuration also allows a preformed tubular member to be insert-molded such that the inside of the tubular member defines a passage. Thus, compared to a situation where a die-cast surface defines the inner surface of the passage, the passage can have a smoother inner surface, thus reducing the flow resistance of a fluid flowing through the passage.

A fifth aspect of the present disclosure is an embodiment of the first aspect of the present disclosure. In the fifth aspect, the tubular member has been insert-molded such that the portion of the circumferential wall of the tubular member is exposed through the material surrounding the tubular member.

A sixth aspect of the present disclosure is directed to a method of making a hollow product with a hollow portion. The method includes the steps of: insert-molding a tubular member to define the hollow portion; and removing, after the step of insert-molding, a circumferential portion of a circumferential wall of the tubular member in a predetermined range in an axial direction of the tubular member, thus exposing the hollow portion to outside.

A seventh aspect of the present disclosure is an embodiment of the sixth aspect. In the seventh aspect, the step of removing includes performing a machining process to remove the circumferential portion of the circumferential wall of the tubular member and a material surrounding the tubular member simultaneously.

In the step of removing, the material may be removed by any of various machining techniques such as cutting, laser cutting, sharing, and wire-saw cutting.

According to the present disclosure, a circumferential portion of a circumferential wall of an insert-molded tubular member is removed, along with its surrounding material, in a predetermined range in the axial direction of the tubular member, thus exposing the hollow portion to the outside. This allows a hollow product having a hollow portion formed in an undercut shape to be integrally molded in a shorter cycle time, thus cutting down the cost.

DETAILED DESCRIPTION

Embodiments of the present disclosure will now be described in detail with reference to the drawings. The following embodiments are merely exemplary ones in nature, and are not intended to limit the scope, application, or uses of the present disclosure.

Figure 1:
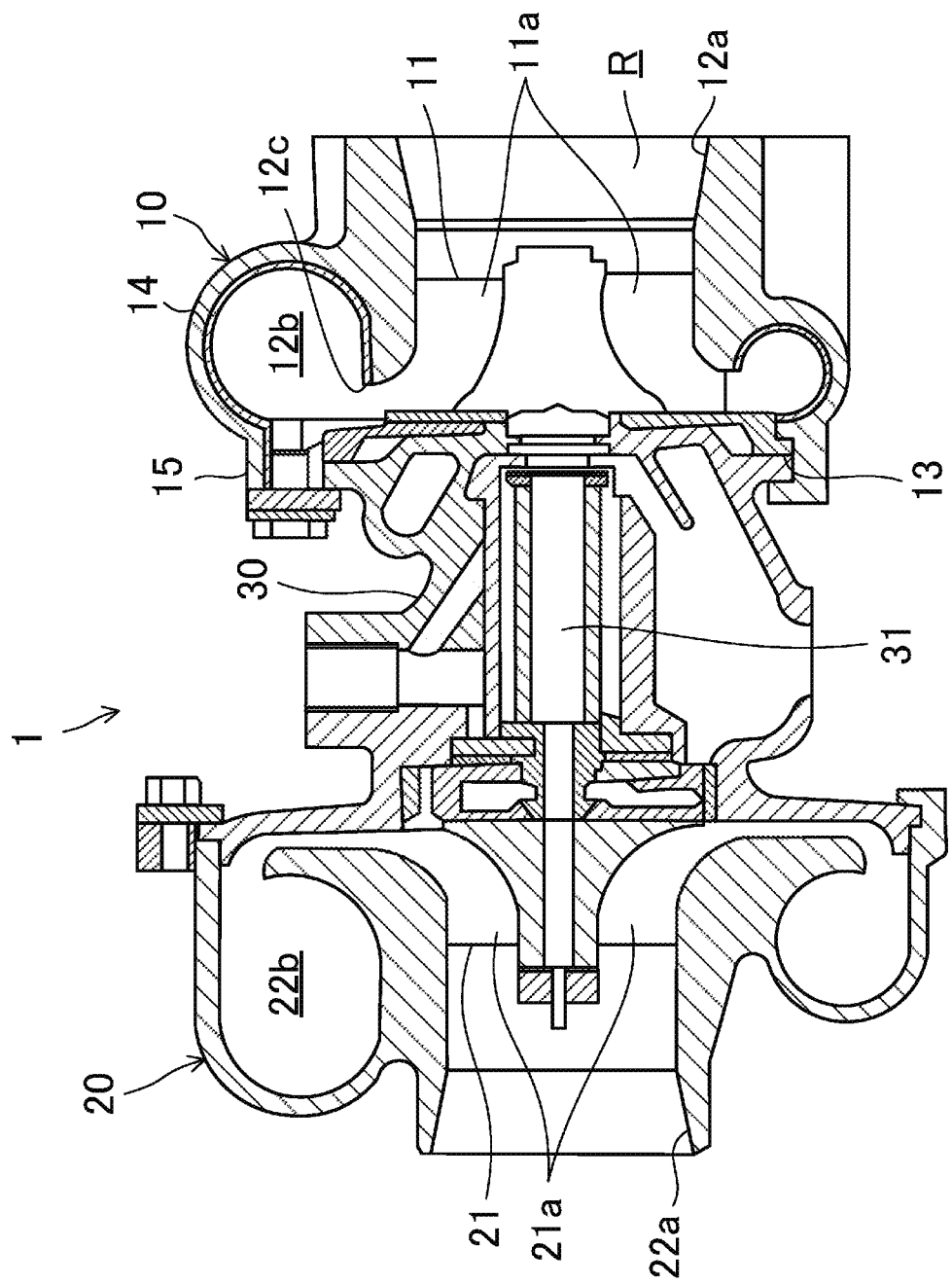
FIG. 1 is a cross-sectional view illustrating the structure of a turbocharger according to an embodiment.

FIG. 1 is a cross-sectional view illustrating a general structure of a turbocharger 1 according to an embodiment of the present disclosure. The turbocharger 1 is provided for the intake system of an engine (typically, an internal combustion engine) built in an automobile (not shown) and is configured to compress the intake air by using the pressure of an exhaust gas of the engine. Although the turbocharger 1 is not illustrated in detail in FIG. 1, the turbocharger 1 actually includes a cooling oil passage, various types of sensors (not shown), and other members, for example.

Overall Configuration for Turbocharger 1

The turbocharger 1 includes a compressor 10 and a turbine 20. The turbine 20 is provided halfway through the engine's exhaust system, while the compressor 10 is provided halfway through the engine's intake system. The turbine 20 is comprised of: a turbine wheel 21 with a plurality of turbine blades 21a; and a turbine housing 22 to house the turbine wheel 21. A turbine-side hole 22a is cut open through an end surface of the turbine housing 22. In addition, a turbine-side passage 22b to allow the exhaust gas to flow through is also provided inside the turbine housing 22.

The compressor 10 is comprised of: a compressor wheel 11 with a plurality of compressor blades 11a; a compressor housing 12 to house the compressor wheel 11; and an end plate member 13. A compressor-side hole 12a is cut open through an end surface of the compressor housing 12. This compressor-side hole 12a serves as an air inlet to let intake air pass through. In addition, a compressor-side passage 12b to allow the intake air to flow through is also provided inside the compressor housing 12.

The end plate member 13 is arranged at the other end of the compressor housing 12, opposite from the compressor-side hole 12a. A wheel housing room R to house the compressor wheel 11 is defined closer to the compressor-side hole 12a than the end plate member 13 is. An intermediate member 30 is provided between the end plate member 13 and the turbine housing 22. The compressor housing 12, the end plate member 13, and the turbine housing 22 are all secured to the intermediate member 30.

The turbine wheel 21 and the compressor wheel 11 are arranged on the same axis to interpose the intermediate member 30 between them. A shaft 31 is supported rotatably by the intermediate member 30. The turbine wheel 21 is secured to one end of the shaft 31, and the compressor wheel 11 is secured to the other end of the shaft 31. This turbocharger 1 is configured such that as the turbine wheel 21 turns in one direction under the pressure of the engine's exhaust gas, the compressor wheel 11 also rotates in the same direction, thus letting the intake air enter the turbocharger 1 through the compressor-side hole 12a.

Configuration for Compressor Housing 12

Figure 5:
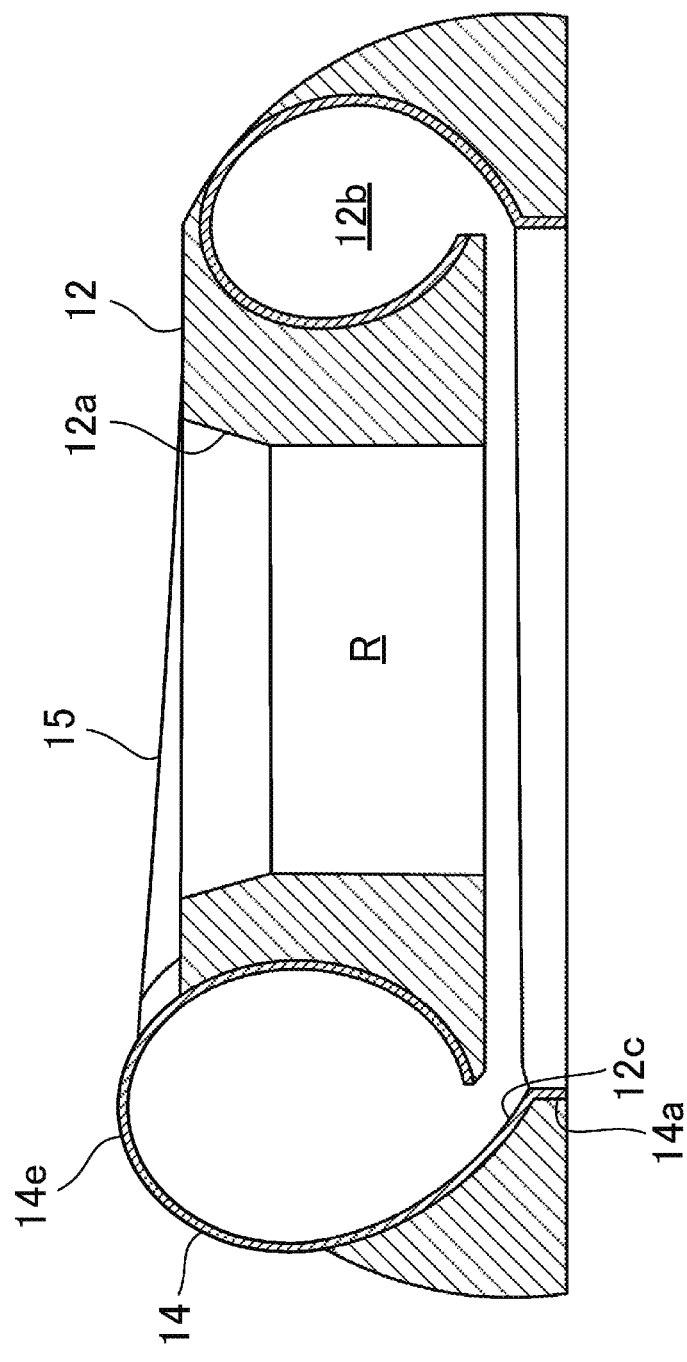
FIG. 5 is a cross-sectional view taken along the plane V-V shown in FIG. 4, illustrating the appearance of the intermediate molded product that has been subjected to a cutting process.

The compressor housing 12 has a compressor-side passage 12b to allow the intake air (or fluid) to flow through. This compressor-side passage 12b has a cavity inside, and therefore, serves as a hollow portion. Thus, the compressor housing 12 is an exemplary hollow product with a hollow portion. Note that the shape of the compressor housing 12 shown in FIG. 1 is only an example. The shape of the compressor housing 12 is not limited to the one shown in FIG. 1 but may also be any of various other shapes such as the one shown in FIG. 5, for example.

The compressor-side passage 12b of the compressor housing 12 is an air passage which is curved overall so as to surround the wheel housing room R and to extend in the direction in which the compressor wheel 11 turns. The compressor-side passage 12b has been molded integrally with an outer peripheral portion of the compressor housing 12. The cross-sectional area of the compressor-side passage 12b varies when taken on a plane that intersects with its centerline at right angles. Specifically, the cross-sectional area of the compressor-side passage 12b is set to gradually decrease from one end of the compressor-side passage 12b toward the other. The end with the larger cross-sectional area is a downstream end of an air flow direction.

The compressor housing 12 includes: a tubular member 14 of an aluminum alloy to define the compressor-side passage 12b; and a body portion 15 of an aluminum alloy. Note that the material of these members does not have to be an aluminum alloy but may also be any of various other kinds of metallic materials as well. The tubular member 14 is insert-molded when the body portion 15 is formed. When the tubular member 14 is insert-molded with the body portion 15, a molten metal, which is the material of the body portion 15, comes into contact with, and is solidified on, the outer peripheral surface of the tubular member 14, thus strongly bonding the tubular member 14 and the body portion 15 together.

A circumferential portion of the compressor-side passage 12b is opened (hereinafter referred to as an "opened portion 12c"). That is to say, a circumferential portion of the circumferential wall of the tubular member 14 has been removed, along with a material surrounding the tubular member 14, in a predetermined range in the axial direction of the tubular member 14, thus exposing the compressor-side passage 12b to the outside. In this embodiment, the predetermined range is a continuous range extending in the axial direction from one end of the tubular member 14 through the other. Thus, the opened portion 12c of the tubular member 14 is formed to extend from one longitudinal end of the compressor-side passage 12b through the other.

The compressor-side passage 12b has such a cross-sectional shape that makes the opened portion 12c narrower in width than anywhere else and that makes the width gradually broader, the more distant from the opened portion 12c, and then makes the width narrow again. That is to say, the cross section of the compressor-side passage 12b comes to have the broadest width in the vicinity of the axis of the tubular member. That is why attempting to form the compressor-side passage 12b with a mold would cause some portions of the passage 12b to interfere with parts of the mold in the mold opening direction. Such portions interfering with parts of the mold in the mold opening direction are so-called "undercut portions." Thus, the compressor-side passage 12b of this embodiment has an undercut shape.

The opened portion 12c of the compressor-side passage 12b communicates with the wheel housing room R of the compressor housing 12. Thus, the intake air that has entered this turbocharger 1 through the compressor-side hole 12a flows through the compressor-side passage 12b while being compressed, and then is fed to the engine.

Also, the tubular member 14 has been insert-molded such that a portion of the circumferential wall of the tubular member 14 is exposed through the material surrounding the tubular member 14 (i.e., the material forming the body portion 15). Specifically, a portion of the circumferential wall of the tubular member 14, which is located distant in the circumferential direction from the opened portion 12c, serves as an exposed portion 14e, which is seen through the body portion 15. The exposed portion 14e may extend from one longitudinal end of the tubular member 14 through the other.

The end plate member 13 is fastened and secured to the body portion 15 of the compressor housing 12 with some fasteners such as nuts and bolts, for example.

Method of Making Compressor Housing 12

Next, it will be described how to make the compressor housing 12. A method of making the compressor housing 12 includes the steps of: insert-molding a tubular member 14; and removing, after the step of insert-molding, a circumferential portion of a circumferential wall of the tubular member 14 in a predetermined range in an axial direction of the tubular member 14, thus exposing the compressor-side passage 12b to outside.

Figure 2:
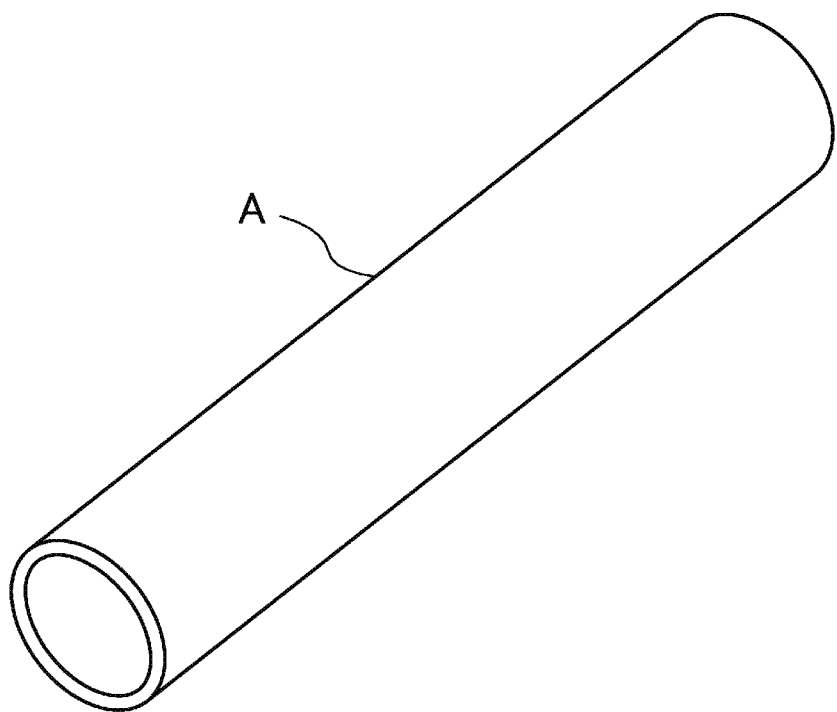
FIG. 2 is a perspective view of a tubular member.

First of all, tubing A such as the one illustrated in FIG. 2 is provided. This tubing A is a member to form the tubular member 14, and is implemented as a metallic straight tube in this embodiment. This tubing A has its diameter either decreased or increased to have a cross-sectional area gradually decreasing from one end thereof toward the other. Such a variation in the cross-sectional area of this tubing A corresponds to a variation in the cross-sectional area of the compressor-side passage 12b. A machine for decreasing or increasing the diameter of the tubing A may be a known one (not shown). In the process step of decreasing or increasing the diameter, the tubing A may be subjected to a drawing process.

Figure 3:
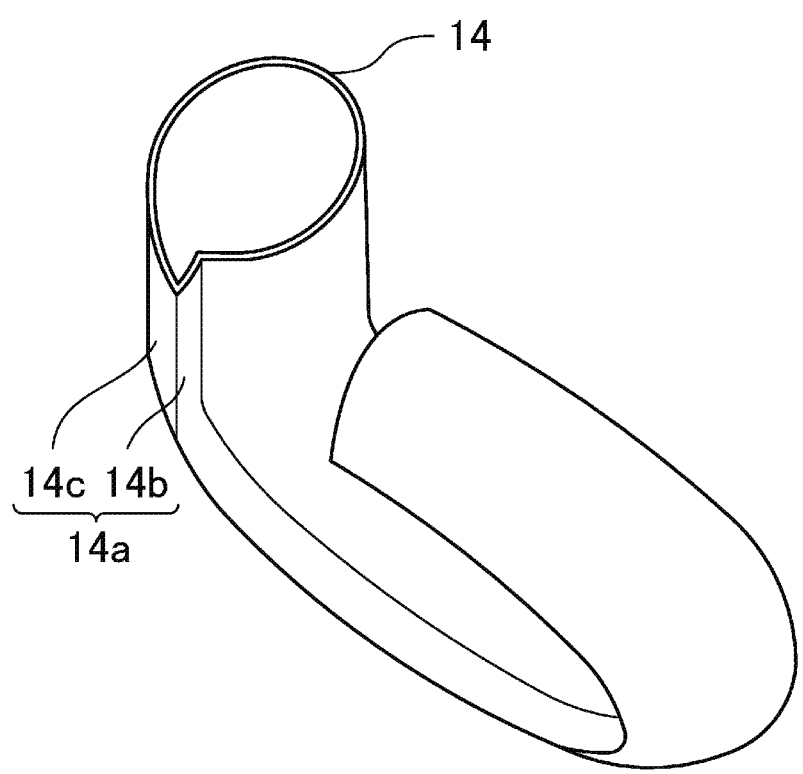
FIG. 3 is a perspective view of a tubular member that has been bent into a desired shape.

Thereafter, the tubing A is bent with a known pipe bender or any other suitable tool to obtain the tubular member 14 shown in FIG. 3. As a result of this bending process, the tubing A may come to have a diameter of approximately 100 mm, for example, although it depends on the size of the turbocharger 1. The inside of the tubular member 14 thus obtained serves as the compressor-side passage 12b. The curvature of the tubing A being bent corresponds to the curvature of the compressor-side passage 12b. In this case, the tubular member 14 starts to be wound at one end thereof with the smaller cross-sectional area and is wound up at the other end thereof with the larger cross-sectional area. The tubular member 14 is formed such that the other end thereof with the larger cross-sectional area runs straight. In addition, another circumferential portion of the circumferential wall of the tubular member 14 defines a projection portion 14a which protrudes radially outward and extends from one longitudinal end of the tubular member 14 through the other. The projection portion 14a is comprised of: a first plate portion 14b which protrudes in a direction parallel to the radial direction of the tubular member 14; and a second plate portion 14c which protrudes in a direction defined by a tangent with respect to the tubular member 14. The tubing A may be bent after the projection portion 14a has been formed. Alternatively, the projection portion 14a may be formed after the tubing A has been bent.

Meanwhile, a die assembly (not shown) is provided to form the body portion 15. The die assembly is an aluminum die assembly for die casting, and may be comprised of a fixed die and a movable die. For example, after the tubular member 14 has been placed in the fixed die, the movable die may be moved to clamp the fixed and movable dies together. Clamping the fixed and movable dies together immobilizes, and firmly holds, the tubular member 14 with the fixed and movable dies. In this process step, the end of the tubular member 14 with the larger cross-sectional area may be held so as to be sandwiched between the fixed and movable dies. Alternatively, that end of the tubular member 14 with the larger cross-sectional area may also be allowed to project out of the fixed and movable dies.

Figure 4:
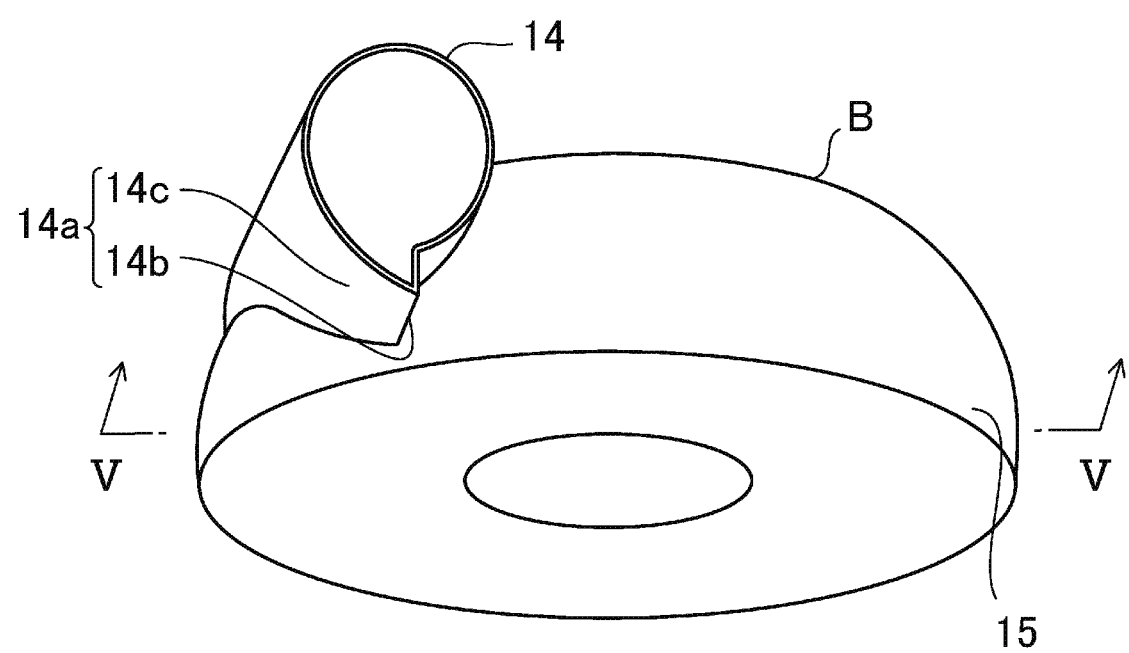
FIG. 4 is a perspective view illustrating an intermediate molded product in which the tubular member has been insert-molded.

After the fixed and movable dies have been clamped together, the inner cavity of the die assembly is filled with a molten metal to form the body portion 15. The molten metal is supplied to, and allowed to flow inside, the gap between the respective surfaces of the fixed and movable dies and the outer peripheral surface of the tubular member 14. Then, the molten metal is solidified and formed into a desired shape by the respective die surfaces. In this process step, the heat of the molten metal melts only a portion of the outer peripheral surface of the tubular member 14 and allows the molten portion of the tubular member 14 to mix with the molten metal. Therefore, when the molten metal is solidified, the tubular member 14 will be welded onto the body portion 15, thus strongly bonding the tubular member 14 and the body portion 15 together. After the body portion 15 has been formed in this manner, the die assembly will be removed to obtain an intermediate molded product A such as the one shown in FIG. 4. The molding process step is done in this manner.

In the removing process step to be performed after the molding process step, a known cutting machine such as a machining center may be used. As a cutting tool, a forming tool or any other suitable tool may be used, for example. In the step of removing, the material may be removed by not only cutting but also by any of various other machining techniques such as laser cutting, sharing, and wire-saw cutting. In the case of cutting, not only the first plate portion 14b of the projection portion 14a of the tubular member 14 but also a portion of the body portion 15 covering the first plate portion 14b are cut off at the same time. In addition, some details of the compressor housing 12, such as a step portion to which the end plate member 13 is fitted, may also be formed into desired shapes by cutting off the body portion 15. This cutting process allows a circumferential portion of the circumferential wall of the tubular member 14 and a material surrounding the tubular member 14 to be removed at a time. Removing the first plate portion 14b and the portion of the body portion 15 covering the first plate portion 14b forms the opened portion 12c, thus exposing a circumferential portion of the compressor-side passage 12b. The compressor housing 12 shown in FIG. 5 may be obtained in this manner. Optionally, the compressor housing 12 shown in FIG. 5 may be further subjected to a cutting process, for example.

Advantages and Benefits of Embodiments

As can be seen from the foregoing description, according to the embodiment described above, insert-molding the tubular member 14 in advance with the body portion 15 allows the compressor-side passage 12b to be defined inside the tubular member 14 with no sand mold casting process performed with a core. In addition, removing a circumferential portion of a circumferential wall of the tubular member 14, along with the material forming the body portion 15, allows the compressor-side passage 12b to be opened. Thus, the compressor-side passage 12b formed in an undercut shape can be obtained as an integrally molded product, which is not comprised of a plurality of parts assembled together. Consequently, this allows the compressor housing 12 with an undercut shape to be integrally molded in a shorter cycle time at a reduced cost.

In addition, this configuration also allows a preformed tubular member 14 to be insert-molded such that the inside of the tubular member 14 defines a compressor-side passage 12b. Thus, compared to a situation where a die-cast surface defines the inner surface of the compressor-side passage 12b, the compressor-side passage 12b can have a smoother inner surface, thus reducing the flow resistance of a fluid flowing through the passage 12b. That is to say, reducing the roughness of the inner peripheral surface of the tubular member 14 to less than that of an ordinary cast surface facilitates a reduction in the flow resistance of a fluid.

Furthermore, according to the embodiment described above, the compressor housing 12 can be molded integrally, thus making the inner surface of the compressor-side passage 12b smooth enough with level differences and other forms of unevenness eliminated from the inner surface. This also contributes to reducing the flow resistance of the fluid.

Figure 6:
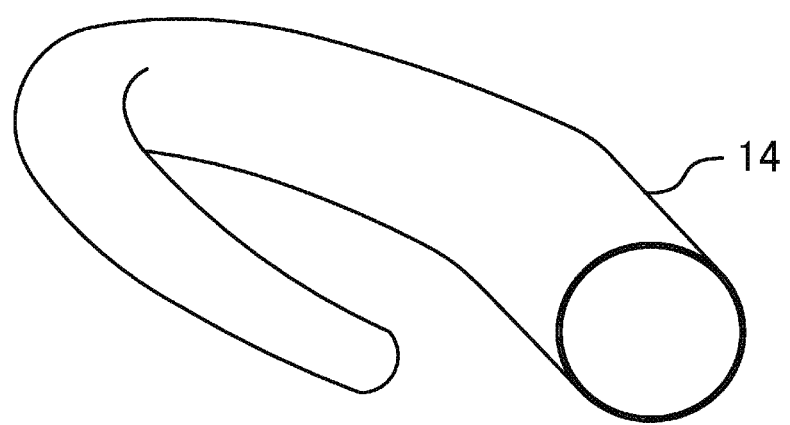
FIG. 6 is a view corresponding to FIG. 3 and illustrating a first variation.
Figure 7:
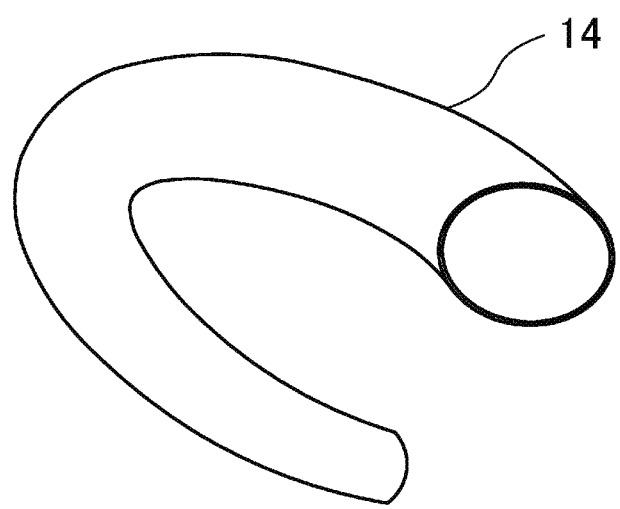
FIG. 7 is a view corresponding to FIG. 3 and illustrating a second variation.

Alternatively, the tubular member 14 may also have a spiral shape as shown in FIG. 6. Still alternatively, the tubular member 14 may have an elliptical cross section as shown in FIG. 7.

Other Embodiments

Note that each and every embodiment described above is just an example in any respect and should not be construed to be a limiting one. Besides, any variations or modifications falling within the range of equivalents to the claims to be described below are all encompassed within the scope of the present disclosure.

In the embodiments described above, the present disclosure is supposed to be applied to making a compressor housing 12. However, this is just an exemplary application of the present disclosure. Alternatively, the present disclosure may also be used to make a hollow product with a passage for any of various kinds of fluids.

Furthermore, the materials used for the tubular member 14 and body portion 15 in the embodiment described above are only an example. Optionally, the tubular member 14 and body portion 15 may be both made of a resin material or may be made of a combination of a resin material and a metallic material.

As can be seen from the foregoing description, a hollow product and method of making the product according to the present disclosure is useful for a compressor housing, for example.

What is claimed is:

1. A hollow product having a body and a tubular member with a hollow portion, wherein
   the body is made of an aluminum alloy and the tubular member is made of an aluminum alloy and is inside in the body in which the tubular member as inserted in the body forms the hollow portion and in which a material of the tubular member is mixed with a material of the body such that the tubular member and the body are welded together, and
   the tubular member has an open portion that runs in an axial direction of the tubular member along a circumferential portion of the tubular member such that the open portion is a slit that has a width that extends in a circumferential direction of the tubular member and has a length that runs along the tubular member in the axial direction of the tubular member in which the length of the slit along the axial direction is larger than the width of the slit in the circumferential direction.

2. The hollow product of claim 1, wherein
   the hollow portion of the hollow product has an undercut shape that prevents a die from passing through it.

3. The hollow product of claim 1, wherein the hollow portion is a passage through which a fluid is allowed to flow.

* * * * *